April 21, 1959
T. J. STEPHENS
2,882,670
ROTARY LAWN MOWER AND ADJUSTABLE GRASS CATCHER
Filed Oct. 26, 1956
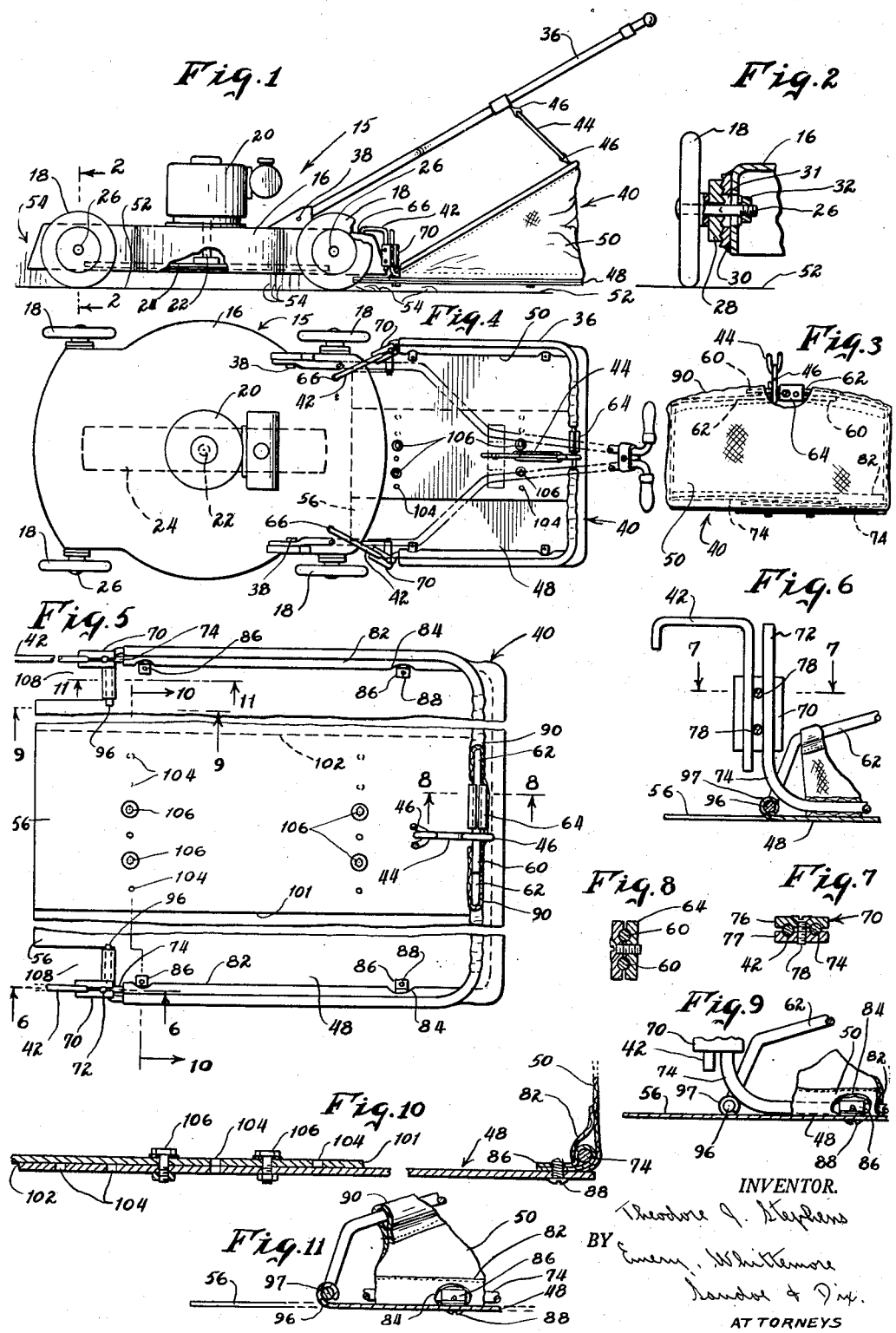
INVENTOR.
Theodore J. Stephens
BY
Emery, Whittemore,
Sandoe & Ivy.
ATTORNEYS

United States Patent Office 2,882,670
Patented Apr. 21, 1959

2,882,670

ROTARY LAWN MOWER AND ADJUSTABLE GRASS CATCHER

Theodore J. Stephens, Pearl River, N.Y.

Application October 26, 1956, Serial No. 618,494

6 Claims. (Cl. 56—194)

This invention relates to grass catchers and more especially to grass catchers for rotary type lawn mowers. The expression "rotary type lawn mowers" is used herein to designate lawn mowers which have a cutter blade revolving at high speed about a substantially vertical axis. The more conventional type of lawn mower having helically shaped blades rotating about a horizontal axis, and shearing the grass against a fixed blade, will be referred to herein as "reel type lawn mowers."

Rotary type lawn mowers have a number of important advantages for cutting grass in yards, and particularly in relatively small yards where there is considerable trimming to be done along curbs, walls, fences and other obstructions where the lawn mower can not overlap any part of these obstructions at edges of the lawn. One advantage of rotary type lawn mowers is that the blade can be arranged to cut beyond the path followed by the wheels. This greatly facilitates trimming because the wheels can remain on the grass while the blade cuts up to the line where the lawn comes against the curb, wall, fence, or other obstruction. Another advantage is that rotary type lawn mowers can cut grass which has been neglected and which has grown too high for satisfactory cutting with a reel type lawn mower.

One of the disadvantages of rotary type lawn mowers is that the cuttings are usually ejected through one side of the housing and are deposited along the path of the lawn mower without being widely distributed. This leaves streaks of cut grass across the lawn and makes the lawn unsightly unless it is raked after being cut. Raking entails considerable additional work, but the grass catchers conventionally used on reel type lawn mowers have not been suitable for rotary type lawn mowers.

It is an object of this invention to provide an improved grass catcher which is not only suitable for use on rotary type lawn mowers, but which can be adjusted for lawn mowers of different sizes. This eliminates the necessity for manufacturing and stocking several sizes of grass catchers. Another object is to provide a grass catcher which can be adjusted to correspond to the height adjustment of the lawn mower. This is a problem not encountered in reel type lawn mowers, but rotary type lawn mowers are conventionally equipped with adjustable axles which permit the entire lawn mower to be raised or lowered with respect to the ground for cutting the grass to different heights.

Some features of the invention relate to a construction which makes the grass catcher economical to manufacture, and rugged and reliable in service.

Other objects, features and advantages of the invention will appear or be pointed out as the description proceeds.

In the drawing, forming a part hereof, in which like reference characters indicate corresponding parts in all the views:

Figure 1 is a side elevation, partly broken away, showing a rotary type lawn mower equipped with a grass catcher made in accordance with this invention;

Figure 2 is a fragmentary, enlarged, sectional view taken on the line 2—2 of Figure 1;

Figure 3 is a rear view of the grass catcher shown in Figure 1;

Figure 4 is a top plan view of the lawn mower and grass catcher shown in Figure 1;

Figure 5 is an enlarged top view of the grass catcher with parts broken away and other parts shown in section to illustrate the construction;

Figure 6 is an enlarged sectional view taken on the line 6—6 of Figure 5;

Figure 7 is a sectional view taken on the line 7—7 of Figure 6;

Figure 8 is a greatly enlarged sectional view taken on the line 8—8 of Figure 5;

Figure 9 is an enlarged sectional view taken on the line 9—9 of Figure 5;

Figure 10 is an enlarged sectional view taken on the line 10—10 of Figure 5; and Figure 11 is an enlarged sectional view taken on the line 11—11 of Figure 5.

Figure 1 shows a rotary type lawn mower 15 having a housing 16 supported by wheels 18. There is a motor 20 on top of the housing and a power shaft 22 of the motor extends in a substantially vertical direction and downwardly into the space enclosed by the housing 16. At the lower end of the power shaft 22 there is a cutter blade 24 which rotates at high speed in a plane substantially parallel to the ground.

Each of the wheels 18 is supported by an axle 26 extending from the housing 16. The axle 26 is adjustable to change the height of the housing 16 above the ground. In the construction illustrated, this adjustment is obtained by having the axle 26 project through a hole in a block 28 (Figure 2) having notches that engage in complementary notches in a bracket 30 on the side of the housing 16. The axle passes through a slot 31 in the bracket 30 and the housing 16, and it is secured to the housing by a nut 32. This construction permits up-and-down adjustment of the axle by loosening the nut 32 and engaging the respective notches of the block 28 with different notches of the bracket 30. The construction shown is merely illustrative of means for adjusting the wheels 18 up and down with respect to the housing 16.

Referring again to Figure 1, the lawn mower 15 has a handle 36 connected to the housing 16 by pivots 38. There is a grass catcher 40 attached, at its forward end, to the housing 16 by hooks 42. The rearward end of the grass catcher 40 is attached to the handle 36 by a tension element 44 having its opposite ends joined to the handle 36 and grass catcher 40 by connections 46.

The grass catcher 40 has a bottom 48 and a side wall 50, preferably made of fabric, such as canvas. The side wall 50 extends around all sides of the grass catcher 40 except the front side, which is open for receiving grass discharged from the interior of the housing 16 through an opening at the back of the housing. The surface of the ground beneath the lawn mower and grass catcher is indicated by the reference character 52 and some blades of grass 54 are shown in the drawing to illustrate the operation of the lawn mower.

In the preferred embodiment of the invention, as shown in Figure 4, there is a forward portion of the bottom 48 extending beyond the side wall 50 and forming an apron 56 which extends part way under the housing 16, and in the case of some lawn mowers, part way under the space traversed by the cutter blade 24.

A single center support is sufficient at the rearward end of the grass catcher. The location of this support, consisting of the tension element 44 and its lower connection 46, is best shown in Figure 3. The connection 46 extends around overlapping end portions 60 of rods 62 which brace the upper end of the side wall 50. These overlapping end portions 60 are held in assembled relation with one another by a clamp 64 which can be released to adjust the end portions 60 with respect to one another when changing the width of the grass catcher to accommodate lawn mowers of different size. This construction, and its mode of operation, will be explained more fully in connection with Figures 5 and 8.

Referring to Figures 1 and 4, the forward end of the grass catcher 40 is supported from the housing 16 by having the hooks 42 extend into holes 66 drilled through the top of the housing. There are two hooks 42, one being located near each side of the grass catcher, and these hooks give the grass catcher its lateral stability. The horizontal portion of each of the hooks 42 limits the extent to which the hook can move downwardly in the holes 66. With this construction, it will be apparent that the grass catcher can be applied to any existing rotary type lawn mower by merely drilling two holes 66 in the top of the housing of the lawn mower near the rearward end of the housing.

The location at which the holes should be drilled is determined by placing the grass catcher in the proper position behind the lawn mower and then swinging the hooks 42 over the top of the housing 16. The horizontally extending portion of each hook 42 can be in a fore-and-aft direction, or it can extend at an angle to the direction of movement of the lawn mower, as is the case in Figure 4. The locations chosen for the holes 66 will depend upon the shape of the housing of the particular lawn mower, but the horizontal or offset portions of the hooks 42 are sufficiently long so that the hooks will extend over the top wall of any of the commercially available rotary type lawn mowers of the sizes built for private yards, whether the mowers are made with straight sides on the housing 16 or with sides that slope outwardly toward the bottom, as is the case with the lawn mower illustrated in the drawing.

Each of the hooks 42 is held at its lower end in a clamp 70; and each of the clamps 70 is connected to an upwardly extending end 72 (Figure 6) at the end of a rod 74. There is a substantial overlap of the rod 74 and the lower end of the hook 42 so as to provide for vertical adjustment of the hook 42. The clamps 70 and the portions of the rods that extend into the clamps constitute connecting means by which the hooks 42 are connected to the lower portion of the grass catcher.

The clamp 70, which may be a conventional wire clamp, is made of two pieces 76 and 77 (Figure 7) connected together by screws 78 and provided with confronting grooves for receiving the hook 42 and the rod 74. When the height of the hook 42 is to be adjusted to raise or lower the grass catcher with respect to the housing of the lawn mower, the screws 78 are loosened and the hook 42, or rod 74, or both of them, are moved with respect to the clamp 70, and then reclamped in their new positions by again tightening the screws 78. Thus the screws 78 make each of the clamps 70 a releasable clamping device for obtaining changes in the level of the hooks 42 above the bottom of the grass catcher and for connecting the hooks to different sides of the bottom with the hooks movable to change their spacing from one another in directions generally parallel to the bottom 48.

Referring again to Figures 1 and 2, the holes 66 are preferably located so that the clamps 70 contact with the back wall of the lawn mower housing 16 to prevent angular, swinging movement of the hooks 42 about the axes of the holes 66. When so attached, the position of the grass catcher 40 is more secure, but this is not essential to the satisfactory operation of the invention.

The rods 74, at the opposite sides of the grass catcher, support the forward end of the bottom 48 of the grass catcher. The connection of the rods 74 to the bottom 48 is shown in Figures 5, 9, 10 and 11. Each rod 74 extends downwardly to a level adjacent to the top surface of the grass catcher bottom 48, and the rod 74 then extends along a side of the bottom 48 and across most of the rearward side of the grass catcher. The end portions of the rods 74, which extend along the different sides of the grass catcher, overlap one another at the rearward end of the grass catcher, the amount of overlap depending upon the width to which the grass catcher is adjusted.

The rods 74 are located in a hem or fold 82 at the bottom of the side wall 50. There are cutouts 84 in the fold 82 at spaced regions along the rods 74 for exposing the rods. These exposed portions of the rods 74 are connected to the grass catcher bottom 48 by brackets 86. Each of the brackets surrounds an exposed portion of one or the other of the rods 74; and the brackets 86 are connected to the bottom 48 by screws 88. These screws 88 and the rods 74 constitute elements at the lower end of the side wall connecting it to the bottom of the grass catcher. In the preferred construction, the rearward ends of the rods 74 are located within a closed portion of the fold 82, as indicated in dotted lines in Figure 3.

At the upper end of the side wall 50 there is a hem or fold 90, similar to the fold 82 at the bottom of the wall. The rods 62 extend through this fold 90 and their overlapping end portions 60 are held in the clamp 64 which is located at a cutout in the fold 90 and which is similar in construction and operation to the clamp 70, already described. When the overlapping end portions 60 are in positions where they have a very substantial degree of overlap, as is the case when the grass catcher is adjusted to a narrow width, the fold 90 forms gathers across the rearward part of the grass catcher. When the clamp 64 is released, and the rod end portions 60 are adjusted to reduce the amount of overlap with one another, the width of the grass catcher is increased and the gathers are reduced. The construction is such that the gathers are eliminated when the grass catcher is adjusted to its maximum width.

The rods 62 extend forwardly and downwardly along the sides of the grass catcher and within the fold 90, at each side of the grass catcher, to the forward end of the fabric side wall 50. Each of the rods 62 extends downwardly to the bottom 48, as shown in Figure 9, and the lower end of each rod 62 turns inwardly across a portion of the grass catcher bottom 48. This inwardly turned end is indicated by the reference character 96 and there are tabs 97 formed from upwardly turned material of the grass catcher bottom 48, extending around the inwardly turned ends 96 to pivotally connect the rods 64 to the bottom 48. These pivots permit the grass catcher to fold for more convenient storage when not in use.

The bottom 48 is made in two parts which overlap one another down the center region of the grass catcher. This construction is best shown in Figures 5 and 10. In Figure 5, the inner edge of the upper half of the bottom is indicated by the reference character 101, and the inner edge of the lower half of the bottom is indicated by the reference character 102. There are two rows of openings 104 in each part of the bottom 48 and the different parts of the bottom are held together by detachable fastening means and preferably bolts 106 inserted through selected openings 104. The opposite parts of the bottom 48 can be moved over one another to change the width of the grass catcher, and in so doing, different holes in the upper part move into register with different holes in the lower part of the bottom. By inserting the bolts 106 through selected holes as they come into register, the width of the grass catcher can be adjusted in relatively small steps to accommodate the grass catcher to lawn mowers of different size.

The apron 56 does not extend across the full width of the grass catcher, but leaves cutout areas 108, as best shown in Figure 5. This provides clearance for the parts of the housing adjacent to the wheels, and the apron 56 is made of a width to extend into the narrowest lawn mower with which the grass catcher is intended to be used. The invention can be constructed without the apron 56, but experience has shown that the apron is useful to provide a surface over which the grass can slide with very little friction when it is blown rearwardly by the rotation of the cutter blade. This advantage is greatest when cutting wet grass. The grass catcher is adjusted vertically so that its bottom is somewhat below the level to which the mower cuts the grass. This prevents the escape of grass cuttings into the space beneath the grass catcher, and it has the further advantage of bending all of the grass forwardly so that wheel marks of the lawn mower are erased from the lawn.

The preferred construction has been illustrated and described, but changes and modifications can be made and some features can be used in different combinations without departing from the invention as defined in the claims.

What is claimed is:

1. Grass cutting apparatus comprising a lawn mower having a cutter blade that rotates about a substantially vertical axis, a housing over and around the area traversed by the cutter, said housing having an opening at the back thereof through which grass cuttings are blown by the action of the cutter blade, a grass catcher rearward of the housing and in line with said opening, the grass catcher having a bottom and a wall open at the front to admit grass blown rearwardly through the opening in the housing, and means for attaching the grass catcher to the lawn mower including hooks that extend upwardly from a forward portion of the grass catcher on each side thereof, said hooks extending forwardly at their upper ends and across the top of the rearward part of the housing and into holes in the housing, said holes being defined by sides that prevent horizontal displacement of the ends of said hooks, and in which there are upwardly extending elements at the forward end of the grass catcher, and the upper portions of these elements overlap the lower portions of the parts of the hooks that extend upwardly, and there are adjustable means connecting the overlapping parts of said elements and hooks, the adjustable means including a releasable clamping device for obtaining changes in the level of the hooks above the bottom of the grass catcher.

2. A grass catcher for use on rotary lawn mowers that have a cutter blade which rotates about a substantially vertical axis within a housing extending over and around the area traversed by the cutter blade, the housing having an opening at the back thereof through which grass cuttings are blown by the action of the cutter blade, said grass catcher including a side wall and a bottom which is of adjustable width to accommodate the catcher to mowers of different width, hooks at opposite sides of the grass catcher at its forward end for supporting the catcher from the housing and in position behind said opening in the housing, the hooks extending upwardly to the level of the top of the housing and then forwardly to reach ahead of the grass catcher and over the top of the housing, means connecting the hooks to a low portion of the grass catcher, the connecting means being adjustable to change the height of the hooks with respect to the bottom of the grass catcher to accommodate the catcher to mowers having different heights of housing, the hooks being connected with different sides of the bottom so that adjustment of the width of the bottom changes the distance between the hooks, and in which the bottom of the grass catcher comprises two overlapping plates, each of which has at least one row of openings which can be brought into position to register with different openings of the other plate when the extent of overlap of the plates is changed to adjust the width of the grass catcher, and each of the hooks connects with a different plate of the bottom, and there are detachable fastening means extending through the openings and holding the plates in fixed relation to one another.

3. A grass catcher for use on rotary lawn mowers that have a cutter blade which rotates about a substantially vertical axis within a housing extending over and around the area traversed by the cutter blade, the housing having an opening at the back thereof through which grass cuttings are blown by the action of the cutter blade, said grass catcher including a side wall and a bottom which is of adjustable width to accommodate the catcher to mowers of different width, hooks at opposite sides of the grass catcher at its forward end for supporting the catcher from the housing and in position behind said opening in the housing, the hooks extending upwardly to the level of the top of the housing and then forwardly to reach ahead of the grass catcher and over the top of the housing, means connecting the hooks to a low portion of the grass catcher, the connecting means being adjustable to change the height of the hooks with respect to the bottom of the grass catcher to accommodate the catcher to mowers having different heights of housing, the hooks being connected with different sides of the bottom so that adjustment of the width of the bottom changes the distance between the hooks, and in which the side wall of the grass catcher extends along both of the longitudinal sides and across the rearward side thereof, and said side wall is made of pliant material attached at its lower end to said bottom, rods connected with the side wall for stiffening said side wall, each of the rods extending part way across the rearward side of the catcher and having an end portion overlapping an end portion of the other rod, the end portions of the rods being movable with respect to one another and into different degrees of overlap with changes in the width of the bottom, and means holding the overlapping ends of the rods substantially parallel with one another.

4. The grass catcher described in claim 3, and in which the stiffening rods are at the top of the side wall and they slope downwardly toward the front of the grass catcher and each has a connection with a different side of the bottom and the connection includes a pivot having its axis extending in the direction of the width of the grass catcher.

5. The grass catcher described in claim 3, and in which the means for holding the overlapping ends of the rods substantially parallel with one another includes a clamp having elements with jaws that grip the respective rods, and releasable means for holding the jaws against said rods with substantial pressure.

6. The grass catcher described in claim 3, and in which there are rods along the upper edge of the side wall, and other rods along the lower edge of the side wall, the end portion of one of the upper rods overlapping the end portion of the other upper rod, and the end portion of one of the lower rods overlapping the end portion of the other lower rod, each of the upper rods being connected to a different side of the bottom by a pivot connection, and each of the lower rods being connected to a different side of the bottom and having its forward end forming a part of the connection of one of the hooks to the bottom of the grass catcher.

References Cited in the file of this patent

UNITED STATES PATENTS

| | | |
|---|---|---|
| 815,242 | Wildermuth | Mar. 13, 1906 |
| 2,701,943 | Johnson | Feb. 15, 1955 |